(12) United States Patent
Chen et al.

(10) Patent No.: US 11,139,713 B2
(45) Date of Patent: Oct. 5, 2021

(54) BRUSHLESS MOTOR STATOR WOUND WITH A SINGLE WINDING WIRE

(71) Applicant: Techway Industrial Co., Ltd., Taichung (TW)

(72) Inventors: Hong Fang Chen, Taichung (TW); Wei-Ting Chen, Taichung (TW); Wei Lin Hsu, Taichung (TW); Ju-Sheng Cheng, Taichung (TW)

(73) Assignee: Techway Industrial Co., Ltd., Taichung (TW)

( * ) Notice: Subject to any disclaimer, the term of this patent is extended or adjusted under 35 U.S.C. 154(b) by 183 days.

(21) Appl. No.: 16/429,148

(22) Filed: Jun. 3, 2019

(65) Prior Publication Data
US 2020/0381973 A1    Dec. 3, 2020

(51) Int. Cl.
*H02K 3/52* (2006.01)
*H02K 1/14* (2006.01)

(52) U.S. Cl.
CPC ............. *H02K 3/522* (2013.01); *H02K 1/146* (2013.01)

(58) Field of Classification Search
CPC .... H02K 3/522; H02K 1/146; H02K 2203/06; H02K 5/225
See application file for complete search history.

(56) References Cited

U.S. PATENT DOCUMENTS

2016/0226339 A1\* 8/2016 Niwa ..................... H02K 5/225
2019/0199156 A1\* 6/2019 Bernreuther ......... H02K 15/085

\* cited by examiner

*Primary Examiner* — Tulsidas C Patel
*Assistant Examiner* — Riley Owen Stout
(74) *Attorney, Agent, or Firm* — Alan D. Kamrath; Karin L. Williams; Mayer & Williams PC

(57) ABSTRACT

A brushless motor stator includes a stator core and a stator winding. The stator core has a stator frame, a coil carrier and multiple pole shoes. The coil carrier is mounted on one of the two openings of the stator frame and has a tooth base and multiple teeth. The teeth are formed on a top surface of the tooth base. The pole shoes are formed on the inner annular surface of the stator frame. The stator winding is formed by using a single wire to wind around the tooth base, the multiple teeth and the multiple pole shoes, and passing through three of the multiple slots of the coil carrier to extend beyond the outer annular surface of the stator frame to form three extended segments to correspond to U-phase, V-phase and W-phase output terminals of a motor, thereby reducing the number of spot-welding on a wiring board.

8 Claims, 5 Drawing Sheets

BRUSHLESS MOTOR STATOR WOUND WITH A SINGLE WINDING WIRE

BACKGROUND OF THE INVENTION

1. Field of the Invention

The present invention relates to a brushless motor stator and, more particularly, to a brushless motor stator wound with a single winding wire.

2. Description of the Related Art

A regular brushless motor stator usually includes a stator core and multiple stator windings. The stator core has six pole shoes annularly formed around an inner surface of the stator core. The stator core further has a coil carrier mounted on one of the two openings of the stator core. The multiple stator windings are mounted on the respective pole shoes and the coil carrier.

During manufacture of regular brushless motor stators, the multiple stator windings are sequentially wound around the six pole shoes and multiple teeth of the coil carrier for the multiple stator windings to form the three U-phase, V-phase and W-phase output terminals between corresponding teeth of the coil carrier.

Upon manufacturing the brushless motor stators, to supply power to each stator winding by contacting the U-phase, V-phase and W-phase output terminals with external terminals, each stator winding should be wound around a corresponding pole shoe by an electromagnetic wire which has two end points. The two end points of each electromagnetic wire need to be welded on a wiring board and an external power source supplies power to the circuits on the wiring board for the power-receiving motor stator to drive the rotor to rotate.

Owing to the necessity of power supplied to the two end points of each electromagnetic wire, the two end points of each stator winding must be welded on the wiring board through which power can be transmitted. However, welding the end points of the electromagnetic wires on the wiring board is rather effort-taking and time-consuming and is also error-prone upon welding.

SUMMARY OF THE INVENTION

An objective of the present invention is to provide a brushless motor stator wound with a single winding wire that utilizes a single electromagnetic wire to wind around a stator core so as to form three extended segments in a stator winding as the three-phase power output terminals for the purpose of reducing the number of spot-welding on a wiring board.

To achieve the foregoing objective, the brushless motor stator wound with a single winding wire includes a stator core and a stator winding.

The stator core has a stator frame, a coil carrier and multiple pole shoes.

The stator frame has two openings opposite to each other, and an inner annular surface and an outer annular surface opposite to each other.

The coil carrier is mounted on one of the two openings of the stator frame and has a tooth base and multiple teeth.

The multiple teeth are formed on and protrude upwards from a top surface of the tooth base. A slot is formed between each adjacent two of the multiple teeth.

The multiple pole shoes are formed on the inner annular surface of the stator frame.

The stator winding is formed by using a single electromagnetic wire to wind around the tooth base, the multiple teeth and the multiple pole shoes and pass through three of the multiple slots of the coil carrier to extend beyond the outer annular surface of the stator frame to form three extended segments serving as a U-phase output terminal, a V-phase output terminal and a W-phase output terminal of a motor, respectively.

Preferably, the brushless motor stator further includes a common welding piece mounted within one of the slots. The stator winding has an electromagnetic wire wound around the tooth base and the multiple teeth of the coil carrier, and the multiple pole shoes, and traversing and contacting the common welding piece.

Preferably, the multiple teeth include a first tooth, a second tooth, a third tooth, a fourth tooth, a fifth tooth, a sixth tooth, a seventh tooth, and an eighth tooth. The first tooth, the second tooth, the third tooth, the fourth tooth, the fifth tooth, the seventh tooth, and the eighth tooth are sequentially formed on the tooth base along a counterclockwise direction and are spaced apart from each other by gaps.

Preferably, a first slot is formed between the first tooth and the second tooth, a second slot is formed between the second tooth and the third tooth, a third slot is formed between the third tooth and the fourth tooth, a fourth slot is formed between the sixth tooth and the seventh tooth, and a fifth slot is formed between the seventh tooth and the eighth tooth.

Preferably, the multiple pole shoes include a first pole shoe, a second pole shoe, a third pole shoe, a fourth pole shoe, a fifth pole shoe, and a sixth pole shoe formed on the inner annular surface of the stator frame and are evenly spaced apart from each other by a gap.

Preferably, the common welding piece is mounted within the fourth slot.

Preferably, the stator winding is formed by arranging an electromagnetic wire according to a sequence of circumferentially traversing and contacting the common welding piece, entering the inner annular surface of the stator frame through the fifth slot to wind around the first pole shoe, extending outwards beyond the outer annular surface of the stator frame through the first slot to form a first extended segment, winding the fourth pole shoe, circumferentially traversing and contacting the common welding piece, winding the second pole shoe, extending outwards beyond the outer annular surface of the stator frame through the second slot to form a second extended segment, winding the fifth pole shoe, circumferentially traversing and contacting the common welding piece, winding the third pole shoe, extending outwards beyond the outer annular surface of the stator frame to form a third extended segment, winding the sixth pole shoe, and circumferentially traversing and contacting the common welding piece. The portions of the stator winding in contact with the common welding piece are jointly welded to the common welding piece.

Preferably, the first extended segment, the second extended segment, and the third extended segment serves as the U-phase output terminal, the V-phase output terminal, and the W-phase output terminal of the motor, respectively.

Preferably, each tooth of the coil carrier has an inner surface and an outer surface opposite to each other. The inner surface of each tooth of the coil carrier is co-planar with the inner annular surface of the stator frame, the outer surface of each tooth of the coil carrier is co-planar with the outer annular surface of the stator frame, and at least one raised block is formed on the outer surface of each tooth of the coil carrier and is elongated in a direction parallel to a direction of the stator winding that is wound around the outer surfaces of the teeth for the stator winding in a form of multiple turns wound around the multiple teeth to be arranged at intervals The foregoing stator winding utilizes the technical means for winding with a single electromagnetic wire. The technical means winds the electromagnetic wire around the tooth base, the multiple teeth and the multiple pole shoes, and passes through three of the multiple slots of the coil carrier to extend beyond the outer annular surface of the stator frame to form three extended segments to serve as U-phase, V-phase and W-phase output terminals, respectively, thereby facilitating manufacture of the stator winding.

Moreover, the first extended segment, the second extended segment and the third extended segment of the stator winding which extend beyond the coil carrier are able to contact and directly electrically connect to the three-phase terminals of the motor for power supply. During the process of spot welding, certain segments of the stator winding traversing the common welding piece can be jointly welded to the common welding piece to significantly lower the count of spot welding. Meanwhile, as the first extended segment, the second extended segment and the third extended segment can be directly connected to the power output terminals of the motor for power supply, the cost of an additional wiring board can be eliminated. Also because there is no need for cutting the stator winding upon manufacture of the stator winding, all it takes is just to extend the stator winding outwards through a specific slot, and the U-phase, V-phase and W-phase output terminals can be formed readily to simplify the production.

Other objectives, advantages and novel features of the invention will become more apparent from the following detailed description when taken in conjunction with the accompanying drawings.

DETAILED DESCRIPTION OF THE INVENTION

Figure 1:
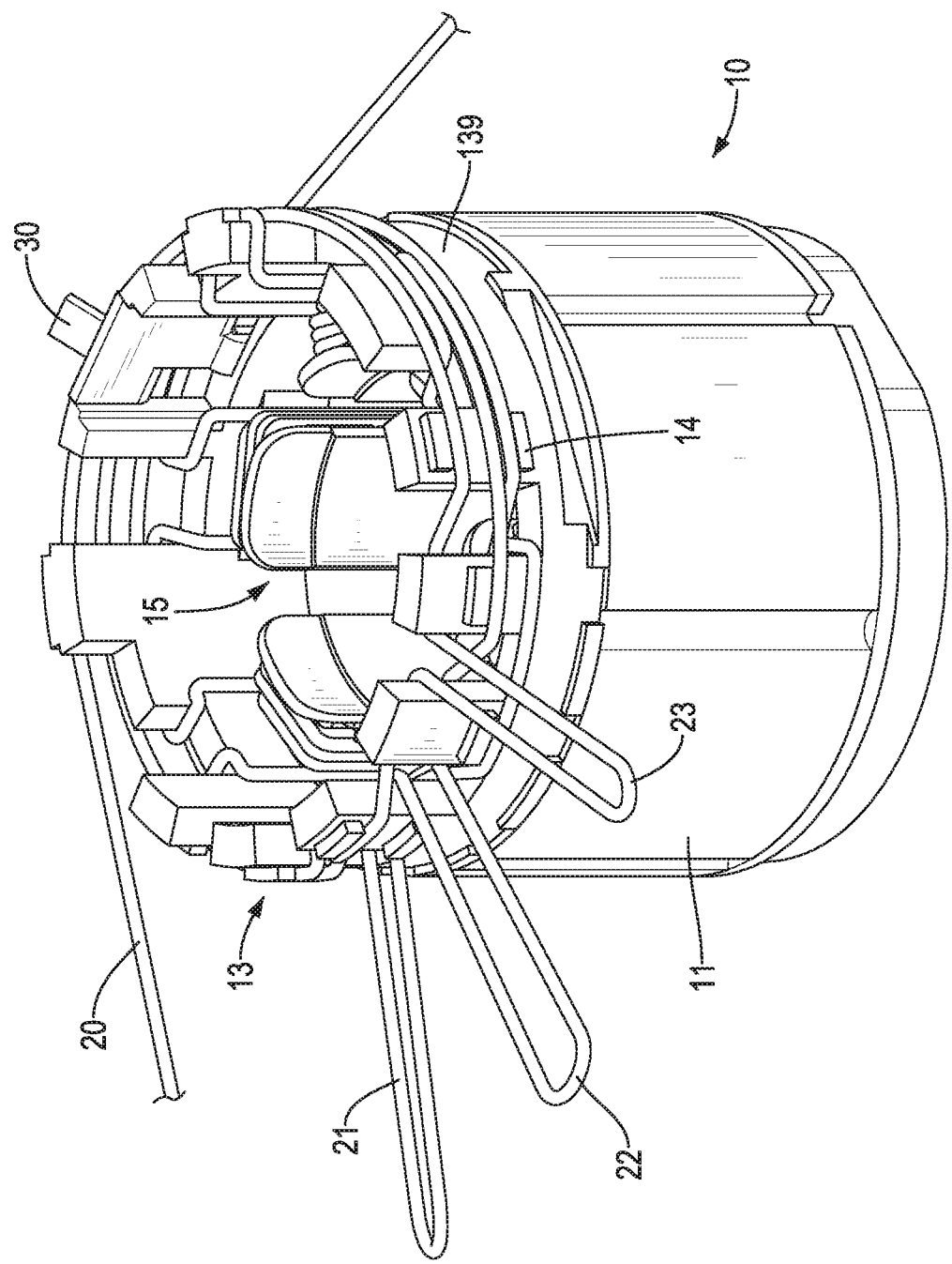
FIG. 1 is a perspective view of a brushless motor stator wound with a single winding wire in accordance with the present invention.

With reference to FIG. 1, a brushless motor rotor includes a stator core 10 and a stator winding 20.

The stator core 10 has a stator frame 11, a coil carrier 13 and multiple pole shoes 15. The stator frame 11 is hollow and cylindrical and has two openings opposite to each other, and an inner annular surface and an outer annular surface opposite to each other.

Figure 2:
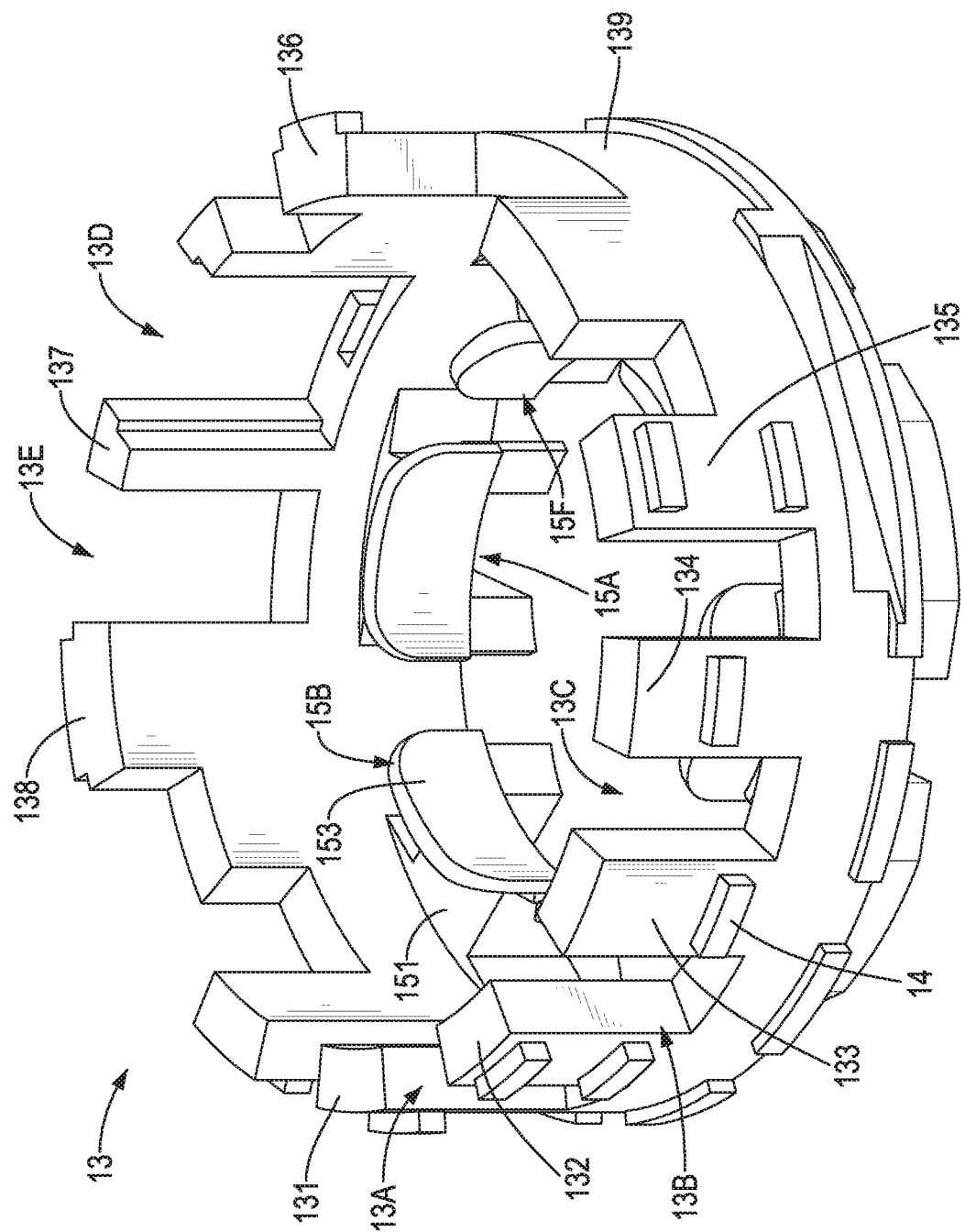
FIG. 2 is a perspective view of a coil carrier of the brushless motor stator in FIG. 1.

With reference to FIG. 2, the coil carrier 13 takes an annular form and is mounted on one of the two openings of the stator frame 11. The coil carrier 13 includes a tooth base 139 and multiple teeth. The tooth base 139 is annular and has a top surface and a bottom surface. The bottom surface of the tooth base 139 is fitted on one of the two openings of the stator frame 11. The teeth are formed on and protrude upwards from the top surface of the tooth base 139, are spaced apart from each other by gaps, and a slot is formed between each adjacent two of the teeth. In the present embodiment, the multiple teeth include a first tooth 131, a second tooth 132, a third tooth 133, a fourth tooth 134, a fifth tooth 135, a sixth tooth 136, a seventh tooth 137, and an eighth tooth 138. The first tooth 131, the second tooth 132, the third tooth 133, the fourth tooth 134, the fifth tooth 135, the sixth tooth 136, the seventh tooth 137, and the eighth tooth 138 are sequentially formed on the tooth base 139 along a counterclockwise direction and are spaced apart from each other by gaps, such that a first slot 13A is formed between the first tooth 131 and the second tooth 132, a second slot 13B is formed between the second tooth 132 and the third tooth 133, a third slot 13C is formed between the third tooth 133 and the fourth tooth 134, a fourth slot 13D is formed between the sixth tooth 136 and the seventh tooth 137, and a fifth slot 13E is formed between the seventh tooth 137 and the eighth tooth 138.

Figure 3:
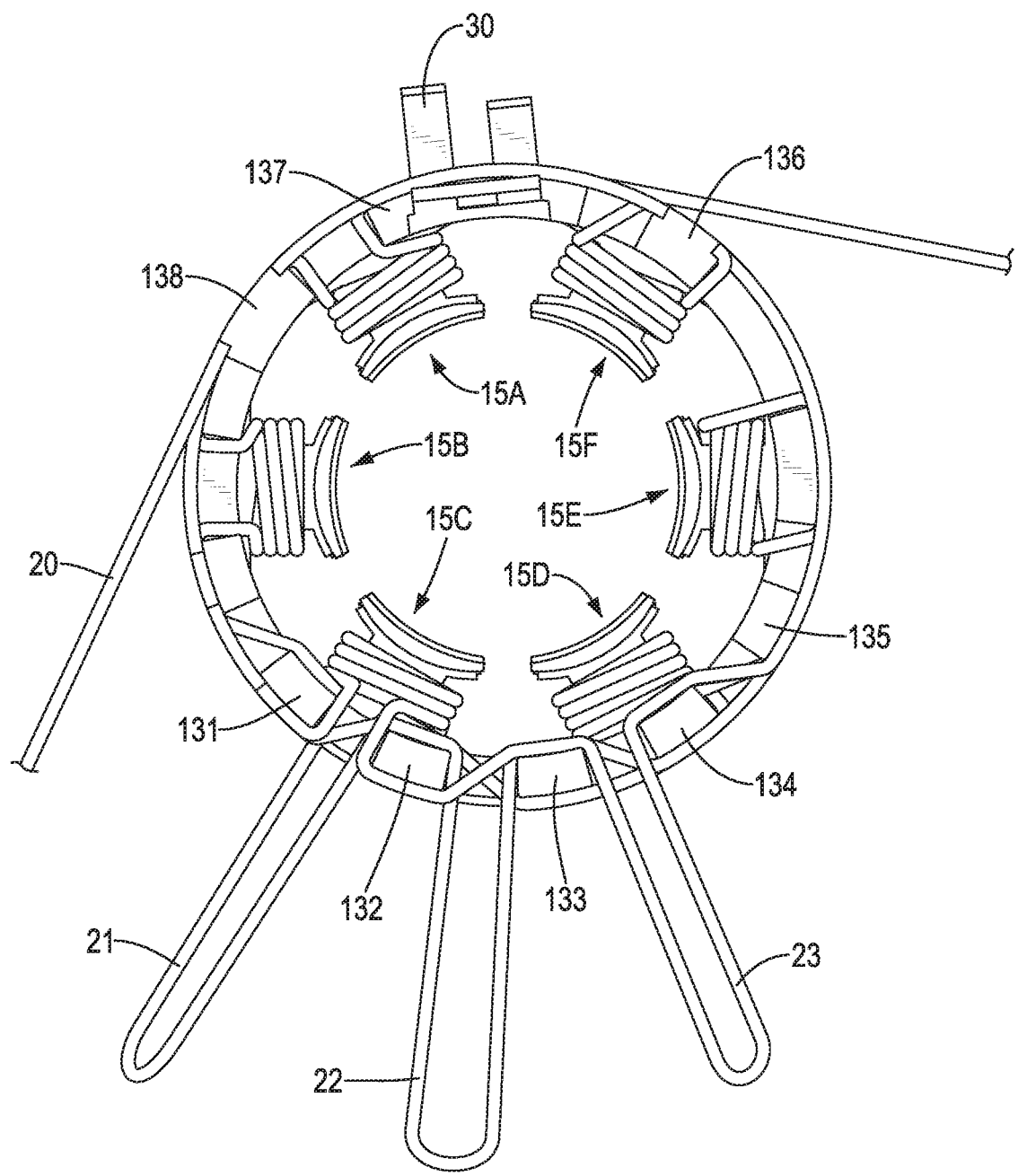
FIG. 3 is a top view of the brushless motor stator in FIG. 1.

With reference to FIGS. 2 and 3, the multiple pole shoes 15 are formed on the inner annular surface of the stator frame 11 and are evenly spaced apart from each other by a gap. Each pole shoe 15 has a tooth portion 151 and a shoe portion 153. The tooth portion 151 may be integrally formed on and protrude radially from the inner annular surface of the stator frame 11. The shoe portion 153 is formed on the tooth portion 151 for the stator winding 20 to be wound around and fastened on the shoe portion 153. In the present embodiment, there are six pole shoes 15. Taking a counterclockwise direction in FIG. 3 as an example, a first pole shoe 15A, a second pole shoe 15B, a third pole shoe 15C, a fourth pole shoe 15D, a fifth pole shoe 15E, and a sixth pole shoe 15F are sequentially arranged.

Figure 4:
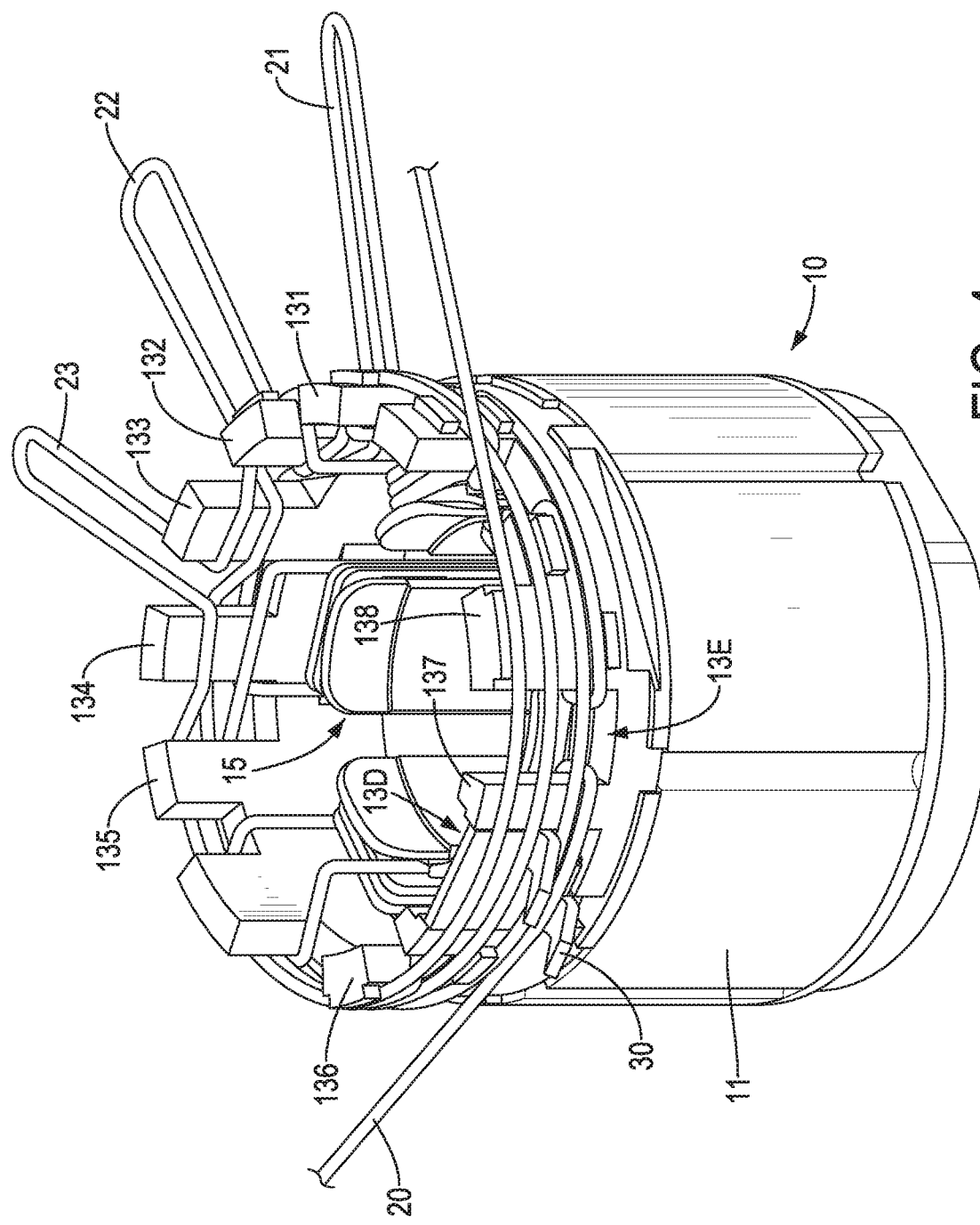
FIG. 4 is another perspective view of the brushless motor stator in FIG. 1.

With reference to FIGS. 2, 3 and 4, the stator winding 20 is formed by using a single electromagnetic wire to wind around the tooth base 139, the multiple teeth and the tooth portions 151 of the multiple pole shoes 15. A common welding piece 30 that is selectively mounted within the fourth slot 13D or within another other slot. A sequence of winding the electromagnetic wire can be stated as follows: the stator winding 20 is formed by arranging an electromagnetic wire coming from the right of FIG. 3 according to a sequence of circumferentially traversing and contacting the common welding piece 30 within the fourth slot 13D, entering the inner annular surface of the stator frame 11 through the fifth slot 13E to wind around the first pole shoe 15A, extending outwards beyond the outer annular surface of the stator frame 11 through the first slot 13A to form a first extended segment 21, winding the fourth pole shoe 15D, circumferentially traversing and contacting the common welding piece 30 for the second time, winding the second pole shoe 15B, extending outwards beyond the outer annular surface of the stator frame 11 through the second slot 13B to form a second extended segment 22, winding the fifth pole shoe 15E, circumferentially traversing and contacting the common welding piece 30 for the third time, winding the third pole shoe 15C, extending outwards beyond the outer annular surface of the stator frame 11 to form a third extended segment 23, winding the sixth pole shoe 15F, circumferentially traversing and contacting the common welding piece 30 for the fourth time, and extending to the left of FIG. 3 in completion of the winding process. After the winding process is done, the portions of the stator winding 30 in contact with the common welding piece 30 are jointly welded to the common welding piece 30. As can be seen from the winding process, the stator winding 20 passes through the common welding piece 30 four times. In other words, there are four segments of the stator winding 20 passing through the common welding piece 30. The four segments of the stator winding 20 are jointly welded to the common spot-welding piece 30 for electrical connection.

With reference to FIG. 4, in the course of the winding process, the stator winding 20 respectively extends through the first slot 13A, the second slot 13B and the third slot 13C to form the first extended segment 21, the second extended segment 22, and the third extended segment 23, which may represent the U-phase, V-phase and W-phase output terminals of the motor without additionally requiring the first extended segment 21, the second extended segment 22, and the third extended segment 23 to be welded and fastened on the wiring board.

Furthermore, each tooth of the coil carrier 13 has an inner surface and an outer surface opposite to each other. The inner surface of each tooth of the coil carrier 13 is co-planar with the inner annular surface of the stator frame 11. The outer surface of each tooth of the coil carrier 13 is co-planar with the outer annular surface of the stator frame 11. At least one raised block 14 is formed on the outer surface of each tooth of the coil carrier 13 and is elongated in a direction parallel to a direction of the stator winding 20 that is wound around the outer surfaces of the teeth. Thus, the stator winding 20 may take the form of multiple turns wound around the outer surfaces of the teeth in order not to get the stator winding 20 twisted as being intertwined with each other. The teeth may have different numbers of the raised block 14. For example, the first tooth 131 has one raised block 14, and the third tooth 133 has two raised blocks arranged at intervals.

Figure 5:
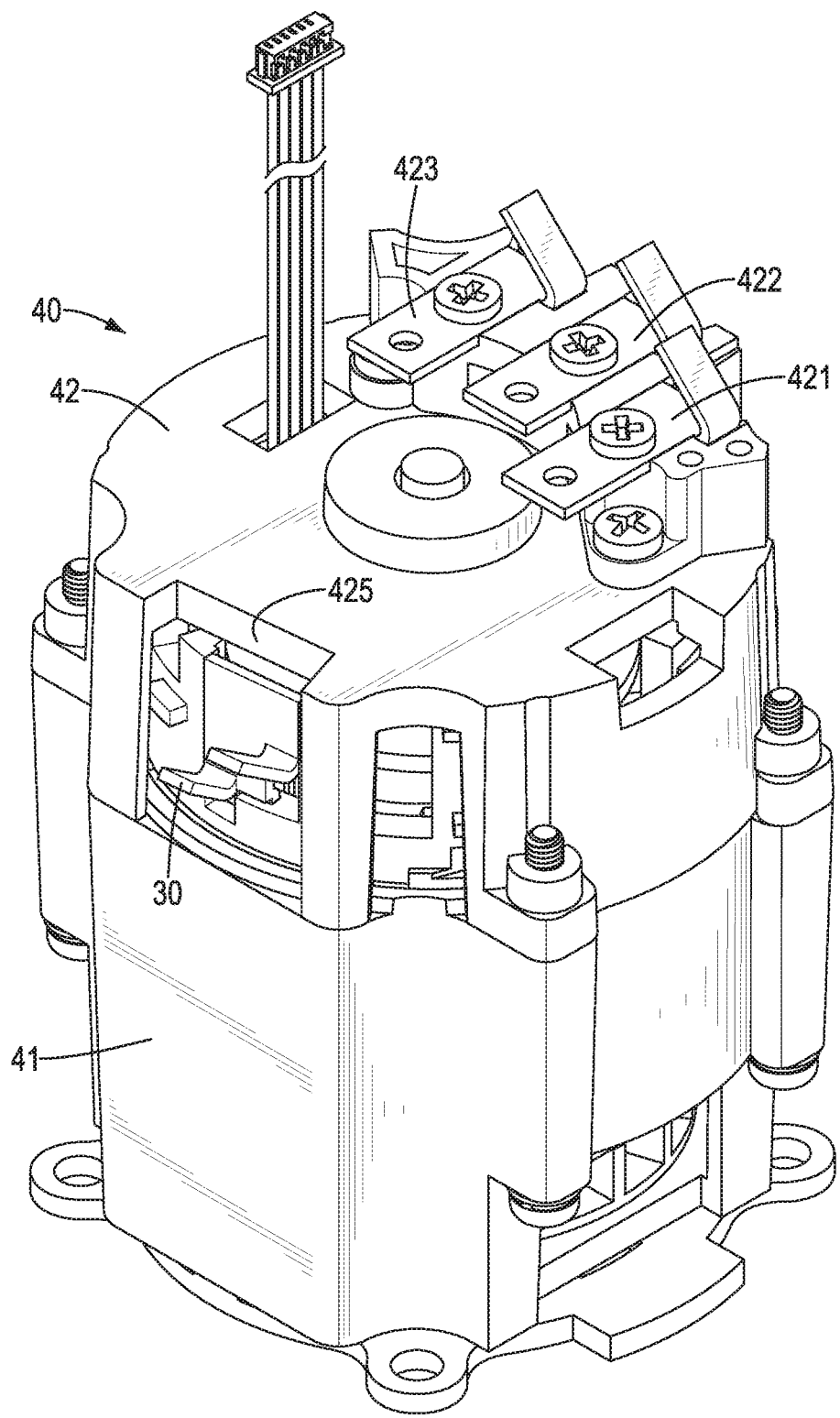
FIG. 5 is a motor having the brushless motor stator in FIG. 1.

With reference to FIG. 5, a motor having the brushless motor stator in FIG. 1 is shown. The motor may include a protective cover 40 and the brushless motor stator in accordance with the present invention. The protective cover 40 has a lower frame 41 and a top lid 42. The lower frame 41 has a chamber centrally defined within the lower frame 41 for accommodating the brushless motor stator. The top lid 42 can be fastened on the lower frame 41 by bolts to cover the brushless motor stator. The top lid 42 has multiple through holes 425 formed through a lateral side of the top lid 42. One of the multiple through holes 425 serves for the common spot-welding plate 30 to be exposed from the through hole 425. The top lid 42 has multiple conducting strips mounted on a top surface thereof. In the present embodiment, the top lid 42 has a first conducting strip 421, a second conducting strip 422 and a third conducting strip 423. The first conducting strip 421, the second conducting strip 422, and the third conducting strip 423 may be fastened on the top surface of the top lid by bolts. The first extended segment 21, the second extended segment 22 and the third extended segment 23 are respectively electrically connected to the first conducting strip 421, the second conducting strip 422 and the third conducting strip 423, allowing an external power source to supply power to the first extended segment 21, the second extended segment 22, and the third extended segment 23 through the first conducting strip 421, the second conducting strip 422 and the third conducting strip 423 respectively. The motor disclosed in FIG. 5 has the same applications as those of regular motors, may be installed on a scooter frame of an electric scooter, or may be applied to all sorts of electric and pneumatic hand tools.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A brushless motor stator wound with a single winding wire, comprising:
    a stator core including:
        a stator frame having two openings opposite to each other, and an inner annular surface and an outer annular surface opposite to each other;
        a coil carrier mounted on one of the two openings of the stator frame and having:
            a tooth base; and
            multiple teeth formed on and protruding upwards from a top surface of the tooth base, wherein a slot is formed between each adjacent two of the multiple teeth; and
        multiple pole shoes formed on the inner annular surface of the stator frame;
    a stator winding formed by using a single electromagnetic wire to wind around the tooth base, the multiple teeth and the multiple pole shoes and pass through three of the multiple slots of the coil carrier to extend beyond the outer annular surface of the stator frame to form three extended segments serving as a U-phase output terminal, a V-phase output terminal and a W-phase output terminal of a motor, respectively; and
    a common welding piece mounted within one of the slots, wherein the single electromagnetic wire that forms the stator winding further passes through and contacts the common welding piece for at least three times, and portions of the single electromagnetic wire multiple in contact with the common welding piece are electrically and jointly welded to the common welding piece.

2. The brushless motor stator as claimed in claim 1, wherein the multiple teeth include a first tooth, a second tooth, a third tooth, a fourth tooth, a fifth tooth, a sixth tooth, a seventh tooth, and an eighth tooth, wherein the first tooth, the second tooth, the third tooth, the fourth tooth, the fifth tooth, the sixth tooth, the seventh tooth, and the eighth tooth are sequentially formed on the tooth base along a counter-clockwise direction and are spaced apart from each other by gaps.

3. The brushless motor stator as claimed in claim 2, wherein a first slot is formed between the first tooth and the second tooth, a second slot is formed between the second tooth and the third tooth, a third slot is formed between the third tooth and the fourth tooth, a fourth slot is formed between the sixth tooth and the seventh tooth, and a fifth slot is formed between the seventh tooth and the eighth tooth.

4. The brushless motor stator as claimed in claim 3, wherein the multiple pole shoes include a first pole shoe, a second pole shoe, a third pole shoe, a fourth pole shoe, a fifth pole shoe, and a sixth pole shoe formed on the inner annular surface of the stator frame and are evenly spaced apart from each other by a gap.

5. The brushless motor stator as claimed in claim 4, wherein the common welding piece is mounted within the fourth slot.

6. The brushless motor stator as claimed in claim 5, wherein the stator winding is formed by arranging an electromagnetic wire according to a sequence of circumferentially traversing and contacting the common welding piece, entering the inner annular surface of the stator frame through the fifth slot to wind around the first pole shoe, extending outwards beyond the outer annular surface of the stator frame through the first slot to form a first extended segment, winding the fourth pole shoe, circumferentially traversing and contacting the common welding piece, winding the second pole shoe, extending outwards beyond the outer annular surface of the stator frame through the second slot to form a second extended segment, winding the fifth pole shoe, circumferentially traversing and contacting the common welding piece, winding the third pole shoe, extending outwards beyond the outer annular surface of the stator frame to form a third extended segment, winding the sixth pole shoe, and circumferentially traversing and contacting the common welding piece, wherein the portions of the stator winding in contact with the common welding piece are jointly welded to the common welding piece.

7. The brushless motor stator as claimed in claim 4, wherein the first extended segment, the second extended segment, and the third extended segment serves as the U-phase output terminal, the V-phase output terminal, and the W-phase output terminal of the motor, respectively.

8. The brushless motor stator as claimed in claim 7, wherein each tooth of the coil carrier has an inner surface and an outer surface opposite to each other, wherein the inner surface of each tooth of the coil carrier is co-planar with the inner annular surface of the stator frame, the outer surface of each tooth of the coil carrier is co-planar with the outer annular surface of the stator frame, and at least one raised block is formed on the outer surface of each tooth of the coil carrier and is elongated in a direction parallel to a direction of the stator winding that is wound around the outer surfaces of the teeth for the stator winding in a form of multiple turns wound around the multiple teeth to be arranged at intervals.

* * * * *